Figure 1:
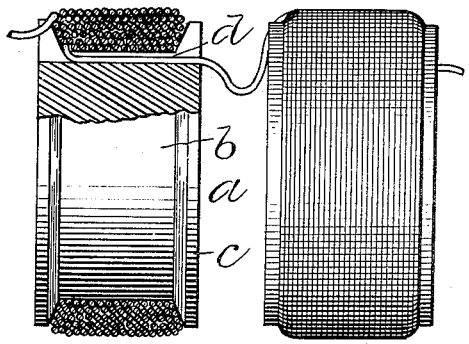

J. D. CHAFFEE.
SPOOL.
APPLICATION FILED APR. 26, 1907.

956,284.

Patented Apr. 26, 1910.

Witnesses.

Inventor.
Joseph D. Chaffee
By H. E. Hart
his Attorney

UNITED STATES PATENT OFFICE.

JOSEPH D. CHAFFEE, OF WILLIMANTIC, CONNECTICUT.

SPOOL.

956,284.

Specification of Letters Patent.　Patented Apr. 26, 1910.

Application filed April 26, 1907.　Serial No. 370,369.

*To all whom it may concern:*

Be it known that I, JOSEPH D. CHAFFEE, citizen of the United States of America, residing at Willimantic, in the county of Windham and State of Connecticut, have invented certain new and useful Improvements in Spools, of which the following is a specification.

The object of my invention is to provide a spool grooved in such a manner as to have special features of novelty and advantage.

One embodiment of the invention is illustrated in the drawings in which—

Figure 2:
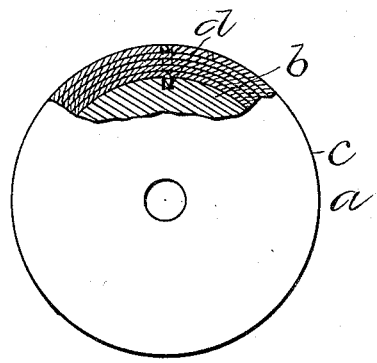

Figure 1 is an edge view of a pair of spools partly in section to show construction and manner of use. Fig. 2 is a side view of a spool with parts broken away to show construction.

Referring to the drawings $a$ is the spool, such as is used for thread or fish lines, having a drum $b$ and circular flanges $c$ $c$. Lengthwise of said drum and through said flanges I cut a groove $d$ of substantial depth. The purpose of said groove is as follows. In winding fish lines fifty yards are usually wound on each spool and a single unbroken line is put on two or three spools so that one may purchase a short line of fifty yards or one of one hundred fifty yards without having to wind on spools of different sizes the short or long lines. In order to put the lines on the market in this manner it is absolutely necessary that there be no weak spots between the spools. A metal guide is used to guide the line onto the spools evenly and the side edge of the guide has a tendency to cut the line where it leads down the inside of a flange on an ordinary spool. By running the line onto the spool through the groove in the flange the edge of the guide cannot touch the line or injure it in any way, consequently a weak spot between the spools is avoided so that a single line may safely be wound on two or more spools. Another advantage of the groove in the spool is that the line may be led through the groove and turned up onto the drum at any distance from the flange when the initial winding starts without causing an uneven outer surface after the spool is wound. The winding can be done at a much greater rate of speed and so reduce the cost of production.

I claim as my invention:—

A package for fish lines and the like comprising a plurality of spools, each spool being made up of a drum, flanges at the ends thereof, and a groove of substantial depth in one of said flanges whereby the lines can be carried from one spool through the groove in the flange of the adjacent spool and onto the drum thereof in a plane below the plane of the second row of windings.

In testimony whereof I affix my signature in presence of two witnesses.

JOSEPH D. CHAFFEE.

Witnesses:
GEORGE W. MELONY,
MARY J. PARENT.